(12) United States Patent
Galbraith et al.

(10) Patent No.: US 12,183,376 B1
(45) Date of Patent: Dec. 31, 2024

(54) DATA READ SYNCHRONIZATION FROM PHASE MODULATED SYNCHRONIZATION FIELDS IN A DATA STORAGE DEVICE

(71) Applicant: Western Digital Technologies, Inc., San Jose, CA (US)

(72) Inventors: Richard Galbraith, Rochester, MN (US); Jonas Goode, Lake Forest, CA (US); Niranjay Ravindran, Rochester, MN (US); Iouri Oboukhov, Rochester, MN (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/364,772

(22) Filed: Aug. 3, 2023

Related U.S. Application Data

(60) Provisional application No. 63/508,678, filed on Jun. 16, 2023.

(51) Int. Cl.
  *G11B 5/596* (2006.01)
  *G11B 20/10* (2006.01)
  *G11B 20/12* (2006.01)

(52) U.S. Cl.
  CPC ...... *G11B 5/59655* (2013.01); *G11B 5/59688* (2013.01); *G11B 20/10037* (2013.01); *G11B 20/1217* (2013.01); *G11B 2220/2516* (2013.01)

(58) Field of Classification Search
  None
  See application file for complete search history.

(56) References Cited

U.S. PATENT DOCUMENTS

| | | | |
|---|---|---|---|
| 5,345,342 A | 9/1994 | Abbott et al. | |
| 5,416,806 A * | 5/1995 | Coker | G11B 5/012 360/32 |
| 5,633,855 A * | 5/1997 | Naito | G11B 27/3027 369/59.19 |
| 5,802,118 A | 9/1998 | Bliss et al. | |
| 5,966,415 A | 10/1999 | Bliss et al. | |
| 6,229,660 B1 | 5/2001 | Chung | |
| 6,507,449 B1 * | 1/2003 | Sutardja | G11B 5/59611 |
| 6,515,812 B1 * | 2/2003 | Bergmans | G11B 20/10009 360/48 |
| 7,342,866 B2 * | 3/2008 | Maruyama | G11B 27/24 369/111 |
| 7,672,071 B2 | 3/2010 | Lau | |
| 7,684,139 B2 | 3/2010 | Eleftheriou et al. | |
| 8,988,807 B1 | 3/2015 | Coker et al. | |

(Continued)

OTHER PUBLICATIONS

Yamamoto et al., "Robust Read Channel System Directly Processing Asynchronous Sampling Data Semantic Scholar", Japanese Journal of Applied Physics, vol. 45, No. 2S, p. 1054, 2005.

*Primary Examiner* — Peter Vincent Agustin
(74) *Attorney, Agent, or Firm* — Patent Law Works LLP

(57) ABSTRACT

Example channel circuits, data storage devices, and methods for data read synchronization from phase modulated synchronization fields are described. A data synchronization detector may receive an oversampled digital read signal read from a synchronization field that uses a single written pattern to encode the start of data position, phase, and gain for the read channel. The write pattern may use a phase modulated carrier signal to encode a pseudo-random binary sequence indicating the start of data position.

20 Claims, 9 Drawing Sheets

(56) References Cited

U.S. PATENT DOCUMENTS

| | | | |
|---|---|---|---|
| 2002/0126749 A1* | 9/2002 | Galbraith | G11B 20/10009 375/345 |
| 2005/0141374 A1* | 6/2005 | Mihara | G11B 27/24 369/47.21 |
| 2006/0002265 A1* | 1/2006 | Kojima | G11B 20/10009 369/47.1 |
| 2006/0187785 A1* | 8/2006 | Yamawaki | G11B 7/0053 369/59.19 |
| 2012/0075976 A1* | 3/2012 | Liu | G11B 20/10055 369/59.19 |
| 2012/0087224 A1 | 4/2012 | Tanaka et al. | |

* cited by examiner

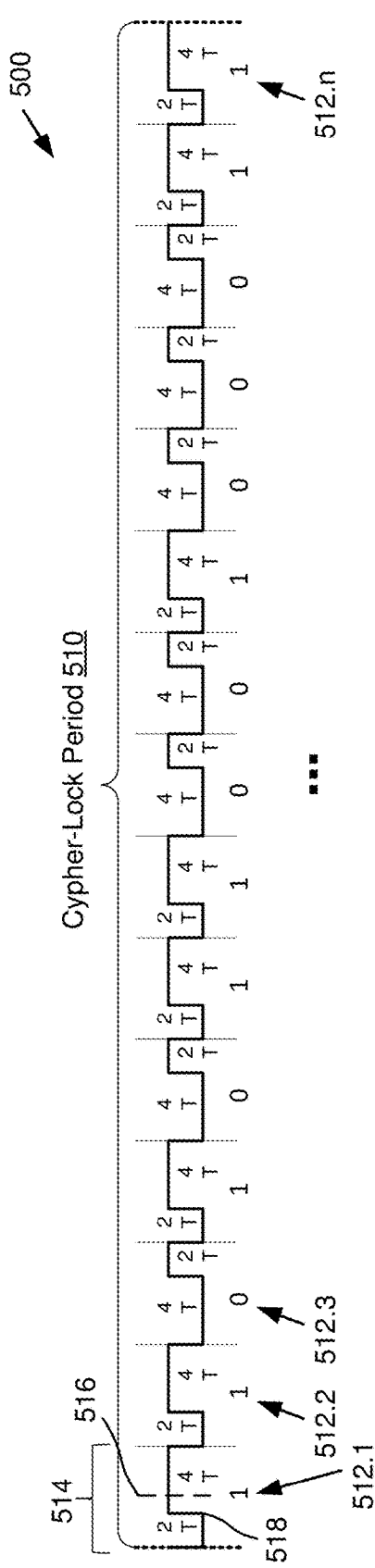
FIG. 5A
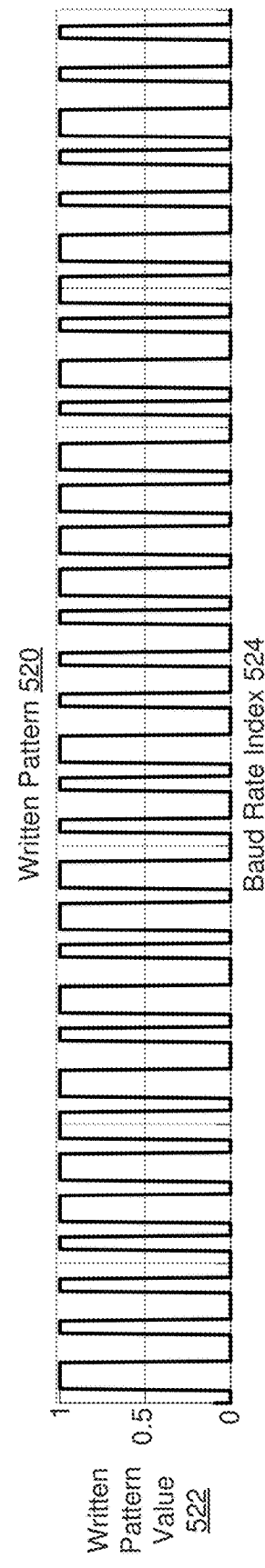
FIG. 5B
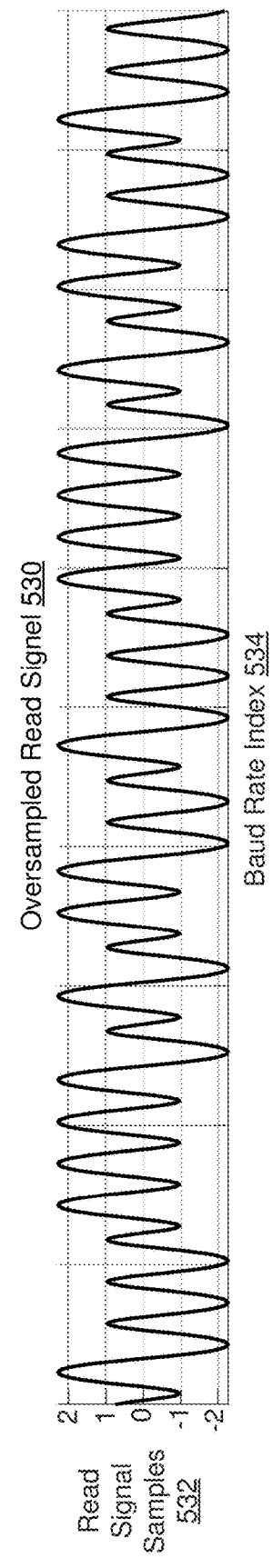

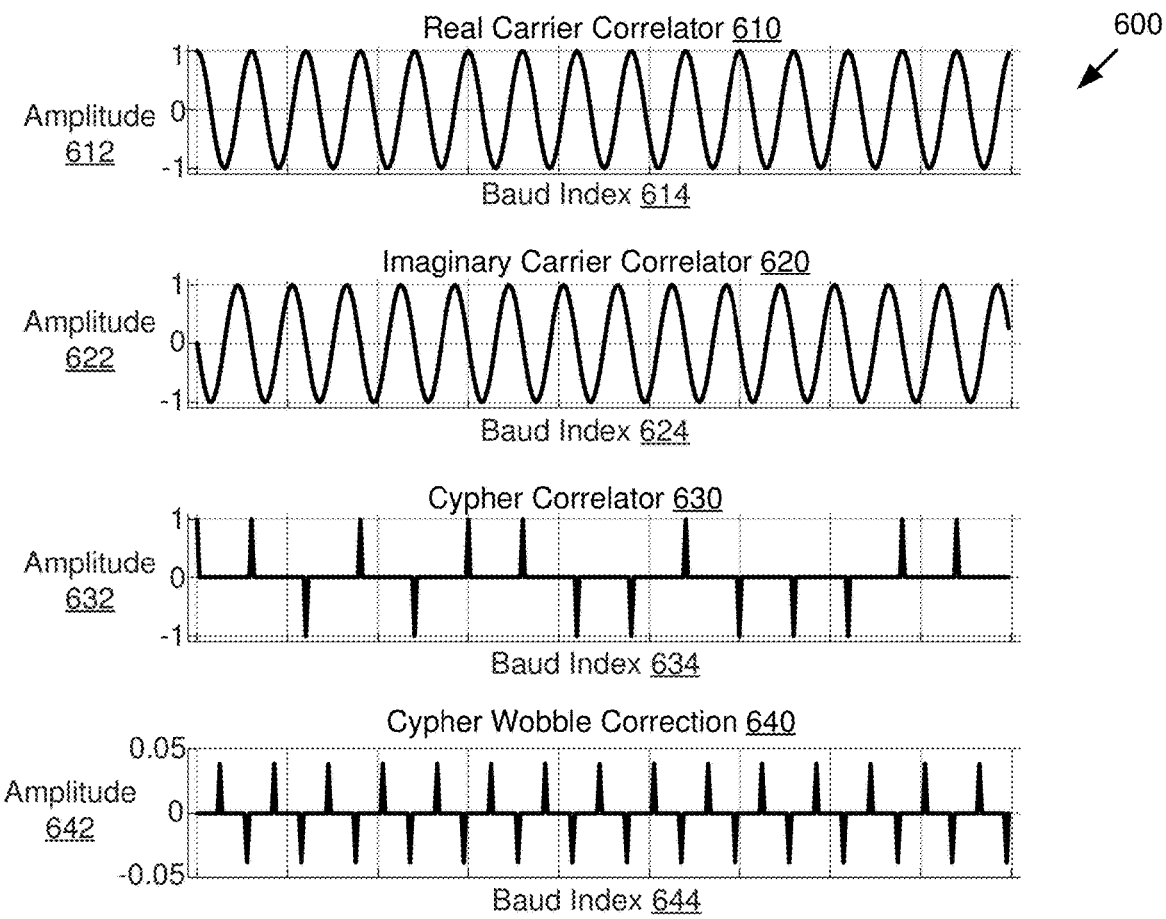
FIG. 6A
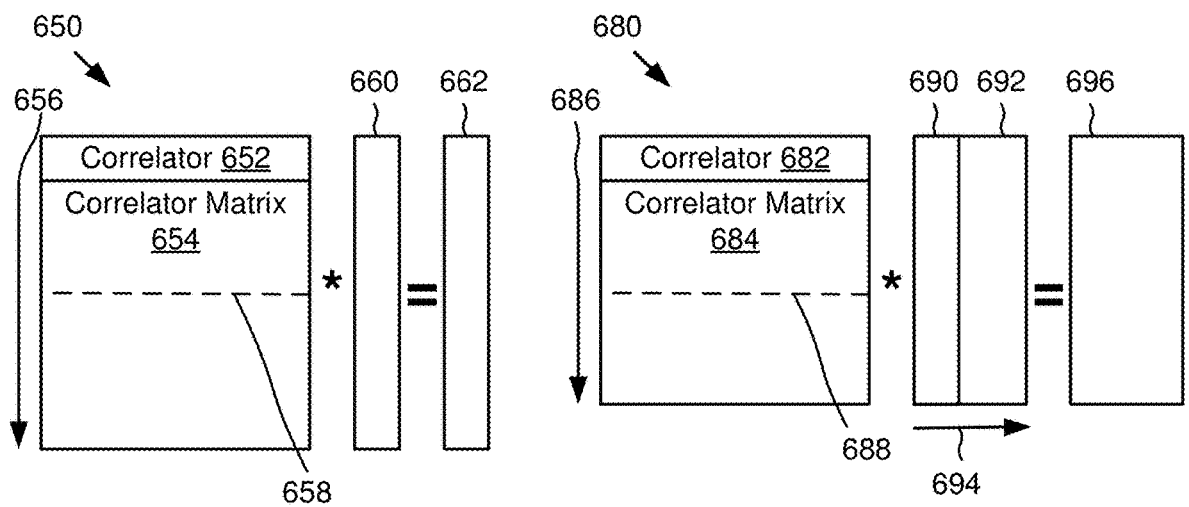
FIG. 6B
FIG. 6C

DATA READ SYNCHRONIZATION FROM PHASE MODULATED SYNCHRONIZATION FIELDS IN A DATA STORAGE DEVICE

TECHNICAL FIELD

The present disclosure relates to read/write channel circuits for data storage devices. In particular, the present disclosure relates to data synchronization fields using a phase modulated synchronization field.

BACKGROUND

Data storage devices such as hard disk drives comprise a magnetic disk and a head connected to a distal end of an actuator arm which is rotated about a pivot by a voice coil motor (VCM) to position the head radially over the disk. The disk comprises a plurality of radially spaced tracks for recording user data sectors and servo sectors. The servo sectors comprise head positioning information (e.g., a track address) which is read by the head and processed by a servo control system to control the actuator arm as it seeks from track to track. The magnetic disk acts as a non-volatile storage medium for storing data.

FIG. 1 shows a prior art disk format 2 as comprising a number of servo tracks 4 defined by servo sectors $6_0$-$6_N$ recorded around the circumference of each servo track. In some configurations, each servo sector comprises a preamble for storing a periodic pattern, which allows proper gain adjustment and timing synchronization of the read signal, and a sync mark for storing a special pattern used to symbol synchronize to a servo data field. The servo data field stores coarse head positioning information, such as a servo track address, used to position the head over a target data track during a seek operation. Each servo sector 6; further comprises groups of servo bursts (e.g., N and Q servo bursts), which are recorded with a predetermined phase relative to one another and relative to the servo track centerlines. The phase-based servo bursts provide fine head position information used for centerline tracking while accessing a data track during write/read operations.

Servo tracks 4 support locating a read head over data tracks 8 to read, write, and/or delete the user data written to those data tracks 8. Data tracks 8 are mapped to servo sectors $6_0$-$6_N$ and servo tracks 4, but not necessarily on a one-to-one basis or following the same path around a circumference of the disk. Once the head is located over a data track based on servo feedback, the read channel needs to synchronize to the data track for data acquisition. In some configurations, data synchronization is based on a preamble 10 for each data sector. Preamble 10 may include a bit-sync field 12 made of a repeated bit pattern, such as a 2T or 3T pattern that may be used by the channel to establish gain and phase measurement values to achieve synchronous sampling of data bits or intra-bit synchronization. Preamble 10 may include a word sync field 14 including a data pattern used to fund a start of data position from the synchronous sampling (inter-bit synchronization) so that the operation on sector data 16 starts with the first bit of that data sector.

FIG. 2 shows a prior art mechanical configuration for a hard disk drive (HDD) 200 comprising a spindle 202 that holds a plurality of platters 204. Each platter 204 has at least one magnetic surface 206, such as a magnetic surface formatted similarly to disk format 2 in FIG. 1. Magnetic surface 206 may be configured to have digitally encoded data stored thereon as magnetized domains. A head 208 may be mounted at the end of an arm 210 controlled by an actuator 212. A read element 214 may be configured to detect magnetized portions of magnetic surface 206 and generate an analog read signal. A write element 216 may be configured to generate a timed write field to write (or erase) magnetized portions of magnetic surface 206 using an analog write signal. In some configurations, head 208 may include more than one read element 214 and/or write element 216 and HDD 200 may include multiple heads 208, arms 210, and/or actuators 212. A preamplifier (preamp or preamplifier circuit) 218 controls the read and write signals to the corresponding read and write elements (e.g., read element 214 and write element 216) of each head (e.g., head 208). Preamplifier 218 may be attached to a flex circuit 220 that provides a data and power bus connection to a printed circuit board (not shown) with other drive control circuitry, such as a disk drive controller, through a flex interface connector 222.

The disk drive controller may include a read/write channel configured to receive an analog read signal from read element 214 through preamplifier 218 and flex circuit 220. The channel or channel circuit may convert the analog read signal to a digital read signal and perform iterative data detection and decoding to recover the data previously stored to disk surface 206. In some configurations, the channel may be configured to perform data detection and decoding on a plurality of data sectors corresponding to a data track. The channel may return detected data units corresponding to data bit representations in the analog read signal. These data units may be passed from the channel to a host interface. In some embodiments, the storage device controller may include a processor, memory, firmware, and other resources for receiving the data units from the channel, providing those data units to the host (with or without additional processing), and otherwise managing and coordinating the various storage device functions and subsystems.

The data channel includes a timing loop configured to achieve proper gain, phase and frequency lock to the data stream from the analog data signal to properly detect and decode data. As described above, this has previously been achieved by two preamble fields directed to bit synchronization (timing and gain) and determining a start of data position respectively. These two data synchronization fields occupy space for each sector.

Technology for providing a unified preamble field that does not require equalization or synchronization of an input signal from the analog-to-digital converter (ADC) may be needed. A unified preamble field and corresponding data channel that determine phase, gain, and start of data synchronization using asynchronous ADC samples may be advantageous.

SUMMARY

Various aspects for data read synchronization from phase modulated synchronization fields are described, particularly preamble formats and read channels configured to use an oversampled digital read signal to determine phase, gain, and start of data values from the same data preamble write pattern, referred to as a cypher-lock field.

One general aspect includes a channel circuit including a data synchronization detector circuit configured to: receive a digital read signal may include a plurality of samples from a synchronization field, where the synchronization field may include a written pattern for a phase modulated carrier signal; determine a start of data position from the plurality of samples; determine a phase value from the plurality of samples; and determine a gain value from the plurality of samples.

Implementations may include one or more of the following features. The channel circuit may include a data detector circuit configured to, responsive to the start of data signal, detect data encoded in data samples in the digital read signal following the plurality of samples from the synchronization field, where the data samples are based on the phase value and the gain value. An oversample rate of the analog-to-digital converter is at least two times the baud rate. The channel circuit may include an analog-to-digital converter configured to determine the digital read signal from an analog read signal by oversampling the analog read signal at a multiple of a baud rate of the channel circuit, where an oversample rate of the analog-to-digital converter is at least two times the baud rate. The channel circuit may include a reference clock configured to determine a baud rate clock signal, where the data synchronization detector circuit uses the baud rate clock signal to determine the start of data position from the plurality of samples at the oversampled rate. The channel circuit may include a read gate detector configured to determine a read gate signal from the digital read signal, where: the written pattern for the synchronization field is a circular sequence having a cypher code length and a buffer length corresponding to a repeated portion of the circular sequence; and the data synchronization detector circuit is further configured to determine the plurality of samples for at least the cypher code length responsive to the read gate signal. The written pattern may include a pseudo random binary sequence; and the data synchronization detector circuit may be further configured to determine the start of data position from the pseudo random binary sequence. The phase modulated carrier signal may be based on a series of sets of magnetic domains having a segment length; the sets of magnetic domains may include a field polarity transition; and a direction of offset of the field polarity transition from a center of the segment length may determine a bit value in the write pattern. The data synchronization detector circuit may include at least one correlator circuit configured to determine the start of data position, the phase value, and the gain value from the plurality of samples. The at least one correlator may include a correlator matrix including a number of correlator lags greater than a sample period of the plurality of samples; and a signal capture register with a length of the sample period and a plurality of lags configured to reduce a size of the correlator matrix. A data storage device may include: the channel circuit; a non-volatile storage medium configured to store: user data stored in a plurality of data sectors, and synchronization fields preceding each data sector of the plurality of data sectors; and a read element configured to generate an analog data signal from the non-volatile storage medium.

Another general aspect includes a method that includes: receiving a digital read signal that include a plurality of samples from a synchronization field, where the synchronization field includes a written pattern for a phase modulated carrier signal; determining a start of data position from the plurality of samples, determining a phase value from the plurality of samples, and determining a gain value from the plurality of samples.

Implementations may include one or more of the following features. The method may include, responsive to the start of data signal: determining, based on the phase value and the gain value, data samples in the digital read signal following the plurality of samples from the synchronization field; detecting data encoded in the data samples; and outputting the data from the data samples. The method may include: generating, from a non-volatile storage medium, an analog read signal; and determining, by an analog-to-digital converter, the digital read signal from the analog read signal by oversampling the analog read signal at a multiple of a baud rate of a channel circuit, where an oversample rate of the analog-to-digital converter is at least two times the baud rate. The method may include: determining a baud rate clock signal; and using the baud rate clock signal to determine the start of data position from the plurality of samples at the oversampled rate. The method may include determining a read gate signal from the digital read signal, where the written pattern for the synchronization field is a circular sequence having a cypher code length and a buffer length corresponding to a repeated portion of the circular sequence; and determining, responsive to the read gate signal, the plurality of samples for at least the cypher code length. The written pattern may include a pseudo random binary sequence; and determining the start of data position may be based on the pseudo random binary sequence. The phase modulated carrier signal may be based on a series of sets of magnetic domains having a segment length; the sets of magnetic domains may include a field polarity transition; and a direction of offset of the field polarity transition from a center of the segment length may determine a bit value in the write pattern. The method may include: determining a first correlation from the plurality of samples indicating the start of data position; determining a second correlation from the plurality of sample indicating the phase value; and determining a third correlation from the plurality of samples indicating the gain value. The method may include: determining a pseudo random binary sequence cypher code for the write pattern for indicating the start of data position; determining a phase modulation pattern for the write pattern for encoding the phase modulated carrier signal; determining a first written pattern for the synchronization field of a first set of data tracks; and determining a second written pattern for the synchronization field of a second set of data tracks alternating with the first set of tracks, where the first written pattern is orthogonal to the second written pattern.

Still another general aspect includes a data storage device that includes: a non-volatile storage medium; a channel circuit; means for receiving a digital read signal may include a plurality of samples from a synchronization field, where the synchronization field may include a written pattern for a phase modulated carrier signal; means for determining a start of data position from the plurality of samples; means for determining a phase value from the plurality of samples; and means for determining a gain value from the plurality of samples.

The present disclosure describes various aspects of innovative technology capable of improving manufacturing costs, timing performance, and/or error rates by supporting more efficient data synchronization from an asynchronous ADC signal. The various embodiments include operations and control circuitry to overcome or at least reduce issues previously encountered in data storage devices and, accordingly, are more efficient, reliable, and/or cost-effective than other data storage devices. That is, the various embodiments disclosed herein include hardware and/or software with functionality to improve data storage device cost and performance, such as by using a unified preamble field based on encoding a phase modulated carrier signal with a start of data pattern. Accordingly, the embodiments disclosed herein provide various improvements to data storage devices and computing systems incorporating such data storage devices.

BRIEF DESCRIPTION OF THE DRAWINGS

The techniques introduced herein are illustrated by way of example, and not by way of limitation, in the figures of the accompanying drawings in which like reference numerals are used to refer to similar elements.

FIGS. 5A and 5B are diagrams of an example cypher-lock pattern and the corresponding write pattern and read signal.

FIGS. 6A, 6B, and 6C are diagrams of an example set of correlations and example correlators that may be used to process the cypher-lock pattern.

DETAILED DESCRIPTION

A unified synchronization field based on encoding a cypher code in a phase modulated carrier signal stored to a magnetic storage medium is described and sometimes referred to as a cypher-lock field. In some configurations, the cypher-lock field may be read from the magnetic storage medium using an oversampled analog-to-digital converter (ADC) in a read channel that supports asynchronous digital sampling from the analog read signal. There is a desire for a single data acquisition preamble field that is compatible with asynchronous (oversampled) channel architectures and may reduce the number of bits needed to encode the data synchronization field, improving format efficiency. The cypher-lock field may enable the channel to determine gain measurement, phase measurement, and start of data based on a set of asynchronous samples.

The cypher-lock field may be based on using phase modulation to generate a carrier tone that is used to determine gain and phase information that allows the oversampled signal samples to be interpolated to obtain synchronous intra-bit channel operation. The phase-phase modulated carrier signal may encode a pseudo-random binary sequence (PRBS) that allows the start of data position (inter-bit location) to be uniquely identified for aligning read operations with the first data bit in a data unit. PRBSs have a unique property that each PRBS only correlates with itself once per cyclic period, allowing the PRBS to be read from any start position with enough bits to complete the pattern (which may be expanded by using a repeated buffer portion of the cyclic pattern).

In some configurations, the cypher-lock field of adjacent tracks may be varied to increase robustness against interference from adjacent tracks. For example, the cypher-lock fields of alternating data tracks may be configured to be orthogonal from a data processing perspective to be easily distinguishable and less likely to interfere with each other's read signals. In some configurations, odd tracks may include one phase modulated carrier signal and even tracks may include a different phase modulated carrier signal. For example, the carrier signals may have inverted polarities, shifted phase, and/or different carrier frequencies.

Figure 1:
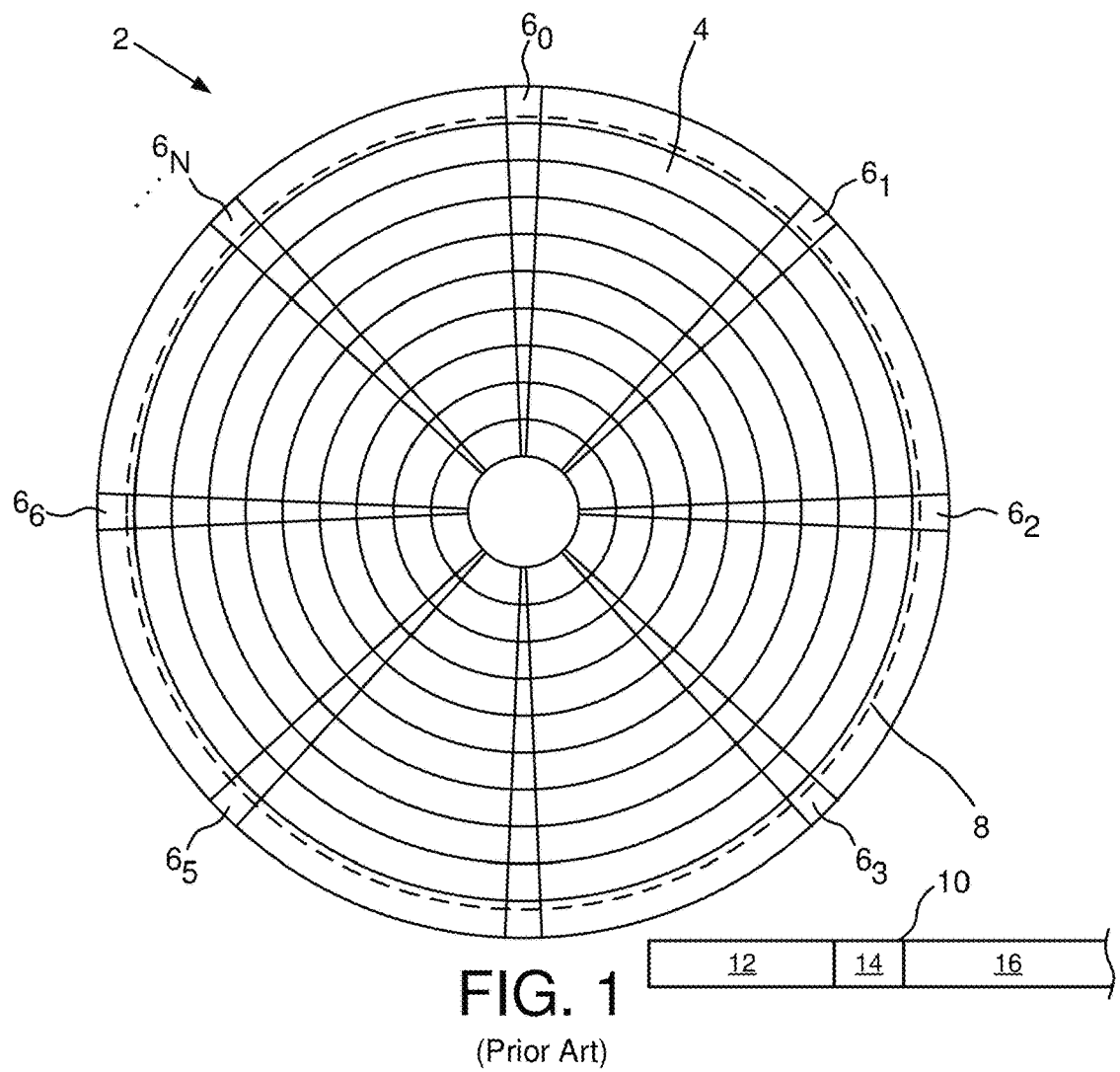
FIG. 1 is a diagram of a prior art disk format comprising a plurality of servo tracks and data tracks with defined synchronization fields.
Figure 2:
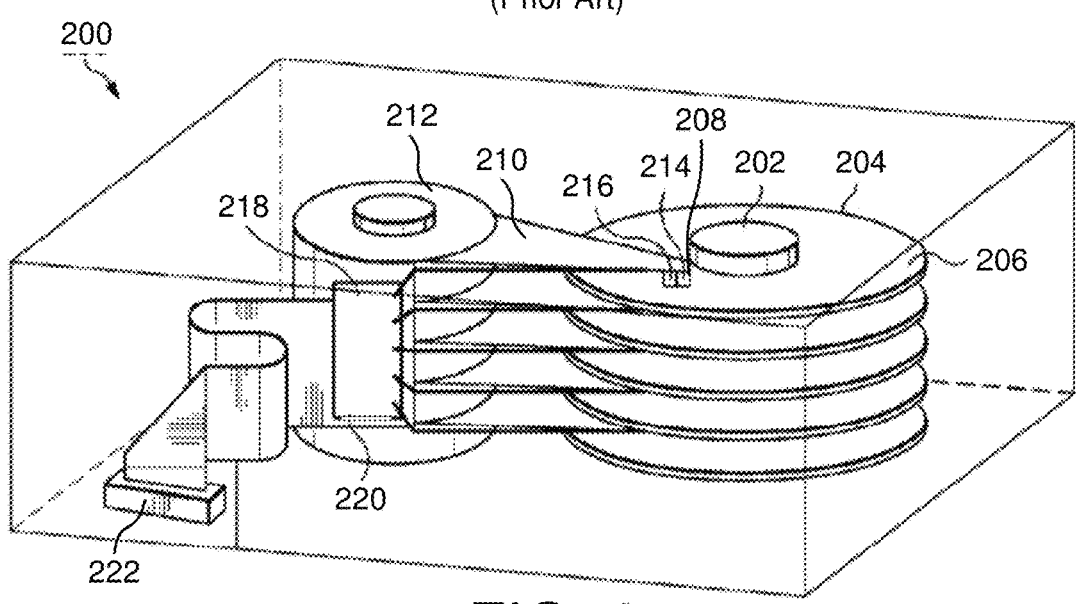
FIG. 2 is a diagram of an example data storage device in the form of a disk drive comprising heads actuated over disk surfaces.
Figure 3:
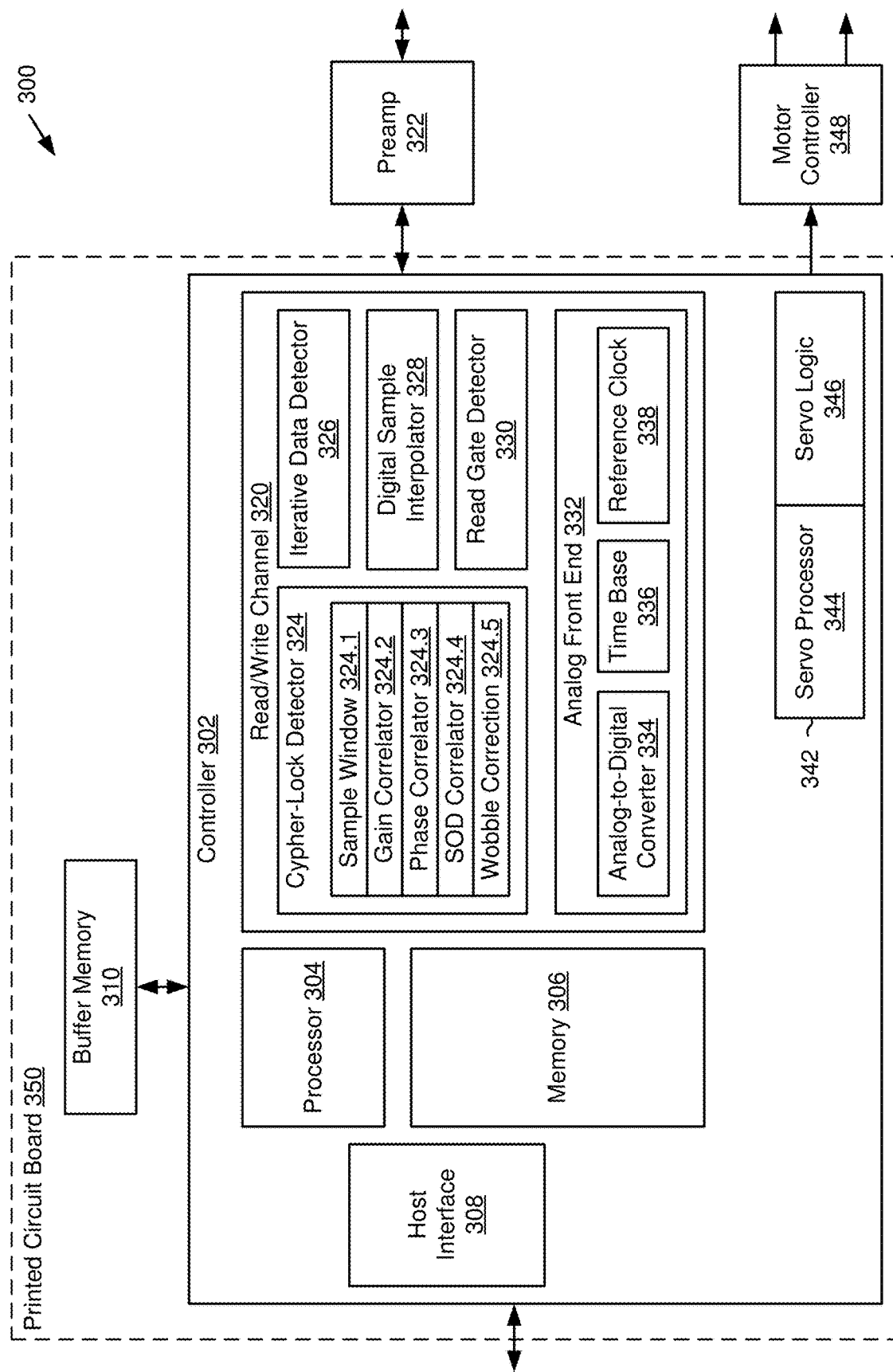
FIG. 3 is a block diagram of a configuration of data storage device electronics for a controller and read/write channel configured for determining read synchronization from a unified preamble field.

FIG. 3 shows a portion of example control circuitry 300 for a data storage device, such as a hard disk drive (HDD). In the example shown, control circuitry 300 may include one or more hardware controllers. Controller 302 may comprise a storage device controller configured to receive host storage commands, process storage operations for writing, reading, and managing data stored to non-volatile storage media in the disk drive, such as the magnetic media disks in FIGS. 1 and 2. In some embodiments, controller 302 may correspond to a separate host interface and read/write path to a subset of disk surfaces in a data storage device with multiple controllers. In some embodiments, controller 302 may be configured to manage servo and read/write operations for one or more actuators, heads, and corresponding writer and reader elements.

Controller 302 may comprise a processor 304, a memory 306, a host interface 308, and access to a buffer memory 310. Controllers 302 may also comprise a read/write channel 320, and a servo controller 342 including a servo processor 344 and servo logic 346. In some embodiments, one or more of host interface 308, read/write channel 320, and servo controller 342 may be embodied in separate packages, such as application specific integrated circuits (ASICs), systems on a chip (SOCs), or other specialized circuits that interface with processor 304 and memory 306 for carrying out their respective functions. Controller 302 may include physical and electrical interfaces for connecting to buffer memory 310, a power source (not shown), preamp 322, motor controller 348, other controllers, and/or other circuitry components. In some embodiments, the components of controller 302 may be interconnected by a bus that includes one or more conductors that permit communication among the components. For example, processor 304, memory 306, host interface 308, read/write channel 320, and/or servo controller 342 may be components attached to a printed circuit board assembly (PCBA) 350 that provides one or more layers of interconnect conductors among the components.

Processor 304 may include any type of conventional processor or microprocessor that interprets and executes instructions. Memory 306 may include a random access memory (RAM) or another type of dynamic storage device that stores information and instructions for execution by processor 304 and/or a read only memory (ROM) or another type of static storage device that stores static information and instructions for use by processor 304 and/or any suitable storage element, such as a system portion of a hard disk media or a solid state storage element. Memory 306 may be configured to store controller firmware, comprising instructions that include one or more modules or sub-modules for specific data storage device operations and processor 304 may execute those instructions, including controlling communication with other components, such as host interface 308, buffer memory 310, read/write channel 320, and servo controller 342.

Host interface 308 may include any transceiver-like mechanism that enables the data storage device to communicate with other devices and/or systems, such as a host system for which the storage device provides data storage. Host interface 308 may comprise a host storage interface compliant with one or more storage interface standards, such as a Serial Advanced Technology Attachment (SATA) interface, a Small Computer System Interface (SCSI), serial attached SCSI (SAS), peripheral computer interface express (PCIe) (e.g., Non-Volatile Memory Express (NVMe)), etc., for connecting host interface 308 to peripheral interface or network port.

Buffer memory 310 may include a RAM, flash, or another type of dynamic storage device for storing host data and other information in transit between the storage media of the storage device and the host (via host interface 308). In some embodiments, buffer memory 310 is a separate memory device from memory 306 and the disk surfaces or other non-volatile memory of the data storage device.

Read/write channel 320 may include one or more specialized circuits configured for processing binary data to be written to the disk surfaces using an analog write signal and processing the analog read signal from the disk surfaces back into binary data. For example, read/write channel 320 may include a write path comprised of various data scramblers, run-length limited (RLL) encoders, iterative error correction code (ECC) encoders, precompensation circuits, and other data or signal processing components. Read/write channel 320 may include a read path comprised of various amplifiers, filters, equalizers, analog-to-digital converters (ADCs), soft information detectors, iterative ECC decoders, and other data or signal processing components. The write channel components may comprise a write channel circuit and the read channel components may comprise a read channel circuit, though the circuits may share some components. Read/write channel 320 may provide the analog write signal to and receive the analog read signal from preamp 322, which controls and amplifies signals to and from the heads. Binary data for recording to the storage medium may be received by read/write channel 320 from controller firmware and decoded data from read/write channel 320 may be passed to controller firmware and/or directed to buffer memory 310 for communication to the host.

In some configurations, read/write channel 320 may include an analog front end 332 configured to receive the analog read signal from preamp 322 and convert it into a digital read signal for processing by other components of read/write channel 320. For example, analog front end 332 may include an ADC 334 that receives an analog data signal from preamp 322 and generates a digital signal for use by other components of read/write channel 320. In some configurations, analog front end 332 may include a timing circuit, and one or more filters, equalizers, and/or other signal conditioning components for generating the digital read signal. In some configurations, analog front end 332 may rely on filtering, equalization, and other analog signal conditioning to be carried out by preamp 322. In some configurations, the timing circuit for the read channel may be embodied in the digital components of read/write channel 320 (i.e., outside analog front end 332) and ADC 334 may operate from time base 336 to achieve its configured sample rate (including an oversampled sample rate). For example, time base 336 may be based on a clock rate of controller 302 that supports operation of the various circuits in controller 302 at substantially greater than the read channel baud rate (i.e., the rate at which data bits from the storage medium are read). In some configurations, analog front end 332 may also include a baud rate reference clock 338 configured to generate a nominal baud rate clock signal for use by one or more timing circuits, detectors, or other components of read/write channel 320.

In some configurations, read/write channel 320 may include a cypher lock detector 324 configured to receive oversampled digital samples from ADC 334 to determine data synchronization to support operation of the read path for reading data from data sectors on the storage medium. For example, cypher-lock detector 324 may be a data synchronization detector circuit configured to respond to a read gate signal by processing a set of digital read signal samples from ADC 334 that correspond to a cypher-lock field on the storage medium. Cypher-lock detector 324 may define a sample window 324.1 for receiving a number of samples equal to the length of the cypher-lock pattern. For example, cypher-lock detector 324 may include a read signal register for receiving a number of samples corresponding to one cycle or period of the PRBS pattern as sample window 324.1. So, a PRBS of 15 pattern segments with each segment encoded in a 6T carrier tone would include 90 bits of data represented by 360 samples at a 4× oversample rate and sample window 324.1 would be 360 samples or 90 bits.

Cypher-lock detector 324 may include one or more correlator circuits comprised of one or more correlator matrices for processing the set of samples from sample window 324.1. For example, the correlator matrix may include a 90-bit correlator and a number of lags for calculating correlations from the read signal samples. In some configurations, a gain correlator 324.2 may calculate a gain value from correlations of the carrier signal magnitude, a phase correlator 324.3 may calculate a phase value from correlations of the carrier signal phase or timing, and a start of data (SOD) correlator may calculate a start of data position from correlation of the cypher code pattern. For example, cypher-lock detector 324 may use the set of read data samples and a baud rate reference clock to determine the gain value, phase value, and SOD value from real carrier correlations, imaginary carrier correlations, and cypher code correlations. In some configurations, cypher-lock detector 324 may also include wobble correction 324.5 configured to correct wobble in the encoding of the cypher code values (e.g., 1 or 0) in each phase modulated segment. Cypher-lock detector 324 may output gain, phase, and start of data values that may be used by read/write channel 320 to determine delta gain and phase settings for updating ADC 334 and determining the data samples to a digital sample interpolator 328 for generating read data signals for processing by iterative data detector 326.

In some configurations, read write channel 320 may include an iterative data detector 326 configured to receive read data from the read heads and use iterative bit detection and ECC processing to decode the received read data into decoded data for further processing by controller firmware and/or communication to the host. For example, iterative data detector 326 may include one or more bit detectors, such as soft output Viterbi algorithm (SOVA) detectors, and one or more iterative decoders, such as low density parity check (LDPC) decoders operating on multi-bit encoded symbols to decode each sector of data received by read/write channel 320. Iterative data detector 326 may receive a digital read signal from ADC 334 in analog front end 332. In some configurations, ADC 334 may generate an oversampled digital signal that is processed by digital sample interpolator 328 and an equalization circuit (not shown) before reaching iterative data detector 326.

Iterative data detector 326 may be sensitive to variations in timing, frequency, and gain in the received digital signals and may operate most effectively when the timing of the digital samples they are processing aligns with the timing of the bit representations in the analog data signal. The actual timing of the bit representations in the read signal generated from the disk may be referred to as a target timing that corresponds to an ideal alignment of digital samples with bit representations in the read signal. This target timing may be known generally to the read channel based on data formatting parameters (e.g., data frequency for the disk/track/etc.) and matched to the baud rate of the channel circuit, but the specific timing of the read signal may need to be periodically reestablished and maintained by a timing loop to address transient offset or timing mismatch with the target timing. For a given read operation, the data synchronization field (e.g., cypher-lock field) and the values generated by cypher-lock detector 324 may set and/or adjust the timing loop for following read data received by read/write channel 320. In some configurations, the operations of iterative data detector 326 may generate data that assists read/write channel 320 in determining whether or not the digital signal samples are aligned with the target timing of the read signal. In some embodiments, one or more outputs from iterative data detector 326 may be provided to a timing gradient engine for determining a timing gradient between the timing of a most recently processed set of digital samples and the target timing. The timing gradient values may be fed back to digital sample interpolator 328 to iteratively improve timing alignment after initial timing for the data sector is determined by cypher-lock detector 324. In some configurations, digital sample interpolator 328, the equalization circuit, iterative detector 324, and the timing gradient engine may comprise a timing loop, such as an asynchronous digital timing loop within read/write channel 320.

Digital sample interpolator 328 may include one or more circuits for receiving an oversampled digital signal from ADC 334, selecting a set of oversampled digital signal values, interpolating a series of interpolated digital signal values between and across multiple oversampled digital signal values, and selecting baud rate sample values from the oversampled digital signal values-converting a digital signal at the oversampled sample rate to a digital signal at the baud rate of the data channel. Digital sample interpolator 328 may output the baud rate digital signal to other components of read/write channel 320, such as iterative data detector 326. In some configurations, digital sample interpolator 328 may be comprised of one or more digital finite impose response (DFIR) structures configured for interpolating the incoming oversampled data stream. For example, digital sample interpolator 328 may be configured for multipoint polynomial interpolation, such as two-point, three-point, four-point, or more interpolation, and use a DFIR with a number of taps equal to the number of interpolation points. In some configurations, the tap weights used in the DFIR may be derived using an interpolating polynomial that passes through N-sample points. For example, 16 sets of tap weights may be used to interpolate in $\frac{1}{16}$ steps between adjacent 4× rate samples, resulting in 64 steps between baud rate samples. The interpolated digital signal values between adjacent oversampled digital sample values (whether based on two-point, three-point or more interpolation) may assembled in a continuous stream for selecting sample values from the stream at the baud rate. Digital sample interpolator 328 may operate on a set of oversampled sample values of at least the oversampling rate and determine a curve between adjacent oversampled values. For example, with a 4× sample rate and based on 16 interpolated values, a 64-step curve of interpolated digital signal values may be used for determining each baud rate digital signal value. Digital sample interpolator 328 may select the corresponding baud rate interpolated signal values from anywhere among the interpolated digital signal values in the 64-step curve, enabling the resulting baud rate digital signal to be asynchronously determined from the oversampled digital signal. The baud rate sample values may not align with any single oversampled sample value. For example, once timing is established, digital sample interpolator 328 may select interpolated digital signal values along the interpolated digital signal at 64 step increments corresponding to the baud rate, regardless of where those baud rate sample points fall on the curve. In some configurations, a lower oversampling rate (e.g., 2×) may use a higher number of interpolation points and/or steps to achieve a desired level of granularity in the interpolated digital signal values.

In some configurations, digital sample interpolator 328 may receive one or more timing gradient values (e.g., phase values) from a timing gradient engine and/or cypher-lock detector 324. Digital sample interpolator 328 may include logic to use the timing gradient values to move the baud rate sample points to better align with the target timing of analog data signal. For example, the timing gradient values received may include an estimated delta value between the current timing being used by digital sample interpolator 328 and the target timing, as determined by the operations of cypher-lock detector 324 and iterative data detector 326. As part of the timing loop, digital sample interpolator 328 may adjust the timing setpoint for baud rate sampling of the interpolated digital signal values between and across the oversampled sample values. For example, the timing gradient values may indicate that the baud rate sampling should be moved forward or back by a delta unit, such as one or more $\frac{1}{64}$th steps along the interpolated curve. In some configurations, digital sample interpolator 328 may include timing control logic for using timing gradient feedback to manage timing alignment for the timing loop.

Read gate detector 330 may include logic for initializing the read of a data sector based on a read gate signal determined from servo controller 342. For example, read gate detector 330 may determine or receive the read gate signal from processor 304 in response to a servo gate signal from servo controller 342 indicating that the servo feedback has positioned the read head over a target data track and known servo mark. In some configurations, there may be bit variations or lag from the start of the data synchronization field and triggering read gate. For example, read gate may be a condition that follows a delay distance calculated for the start of the data sector from a known servo identifier and the precision of this delay may have a known variability. In some configurations, read gate detector 330 may have a known bit variation, such as +/−20 bits when determining read gate from servo gate.

Analog-to-digital converter 334 may include an analog circuit that generates and outputs digital sample values by sampling an analog input at a particular sample rate. For example, ADC 334 may convert an analog read signal of time-varying voltages representing the bits stored in a non-volatile storage medium to a series of discrete sample values corresponding to the magnitude of the voltage at the sample time. The sample rate of ADC 334 determines the number of samples determined per unit time. Because of the digital output of ADC 334, the digital functions are governed by a digital timing signal or time base 336 provided by the digital electronics and power source to which ADC 334 is connected. In some configurations, ADC 334 may be configured for oversampling relative to the baud rate of read/write channel 320. For example, controller 302 may support a time base signal that is substantially higher than the baud rate of the data channels and this higher time base 336 may be used to drive ADC 334 to oversample the analog data symbol at an oversampling sample rate that is an integer multiple of the baud rate by 2× or more. In some configurations, time base 336 may support a sampling rate of 4× or more for ADC 334, resulting in an oversampled digital signal comprised of four oversampled digital sample values for every single baud rate digital sample value. ADC 334 may output the oversampled digital signal comprised of oversampled digital sample values to cypher-lock detector 324 and/or digital sample interpolator 328. In some configurations, the oversampled digital signal may pass through an anti-aliasing filter before reaching cypher-lock detector 324 and/or digital sample interpolator 328.

Servo controller 342 may include one or more specialized circuits configured to process servo data, such as position error signals, from the disk surfaces and providing a control signal to position the actuators in a closed-loop control system. Servo controller 342 may also receive commands from processor 304 for positioning operations, such as seek, track follow, load, unload, sweep, idle, and other actuator positioning operations. Servo controller 342 may also implement servo error recovery processes for recovering from servo errors. In some embodiments, servo controller 342 may include servo processor 344 and servo logic 346 (stored in a servo memory). For example, servo processor 344 may be a dedicated processor circuit and servo logic 346 may be firmware stored in RAM associated with the dedicated processor to provide dedicated computing resources for managing the servo functions. Servo controller 342 may receive servo signals read from the disk surface using preamp 322 and provided to servo controller 342. Servo controller 342 may provide servo control signals to motor controller 348 and motor controller 348 may control one or more actuator VCMs and/or a spindle motor for rotating the disk stack. In some configurations, servo controller 342 may indicate servo gate to processor 304 and/or read/write channel 320 when the read head is positioned over a known position on the storage medium, such as the servo field preceding the start of a target data sector on a target data track.

Figure 4A:
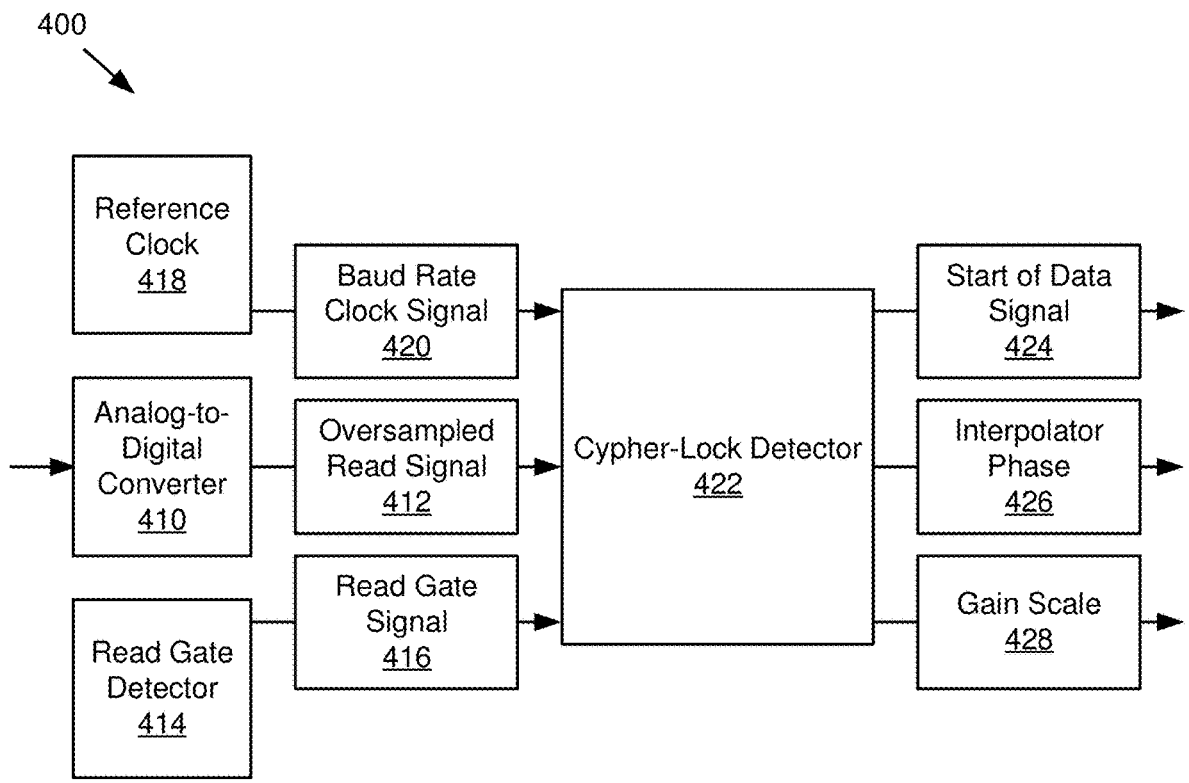
FIGS. 4A and 4B are block diagrams of a portion of an example channel circuit with a cypher-lock detector and associated signals.
Figure 4B:
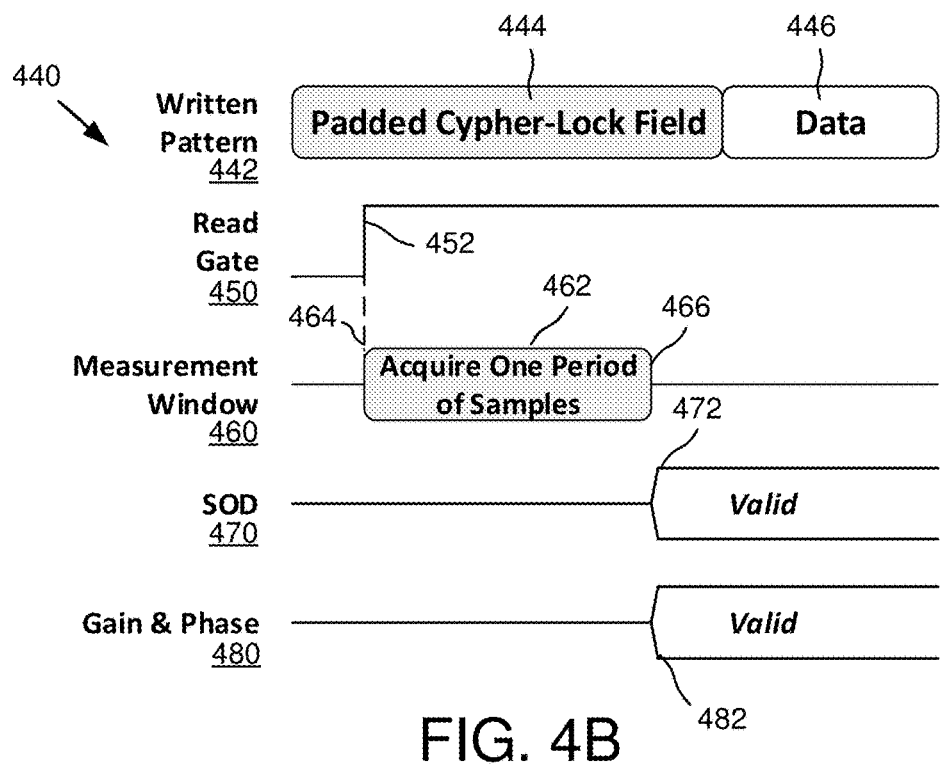

FIG. 4A shows a portion of an example channel circuit with a cypher-lock detector and FIG. 4B shows associated signals 440. In some configurations, architecture 400 may be implemented in a channel circuit, such as read/write channel 320 in control circuitry 300 in FIG. 3. For example, an analog data signal, such as the read signal from preamp 322, may be received by analog-to-digital converter 410 and processed using the components of data synchronization architecture 400 to establish timing, gain control, and start of data for data bit detection and decoding in the read channel.

ADC 410 may operate substantially as described above regarding ADC 334, receiving a time base that supports an oversampled rate that is an integer multiple of the baud rate of the channel circuit and timing loop. For example, ADC 410 may be a 5-bit ADC configured for 4× oversampling of the analog data signal to generate four oversampled digital sample values per bit time of the timing loop. An oversampled read signal 412 composed of digital data samples corresponding to the oversample rate may be sent as inputs to cypher-lock detector 422.

Read gate detector 414 may operate substantially as described above regarding read gate detector 330, determining a read gate signal 416 based on one or more conditions. For example, read gate signal 416 may be responsive to servo gate being established for a target servo field and a predetermined offset timing/distance for asserting read gate from that servo field. Servo gate signal 416 may initiate cypher-lock detector 422.

Reference clock 418 may operate substantially as described above regarding reference clock 338, providing a baud rate clock signal 420. For example, a nominal baud rate clock signal may be generated by or for the operation of the channel timing loop and adjusted over time to more accurately track the frequency and gain of signals read from the storage medium. Baud rate clock signal 420 may be provided to cypher-lock detector 422 for use in the correlator and/or subsequent calculations for determining gain, phase, and start of data values.

Cypher-lock detector 422 may operate substantially as described above regarding cypher-lock detector 324, determining gain, phase, and start of data values from oversampled read signal 412. For example, cypher-lock detector 422 may receive a number of samples corresponding to the written pattern of the cypher code in the phase modulated carrier signal and calculate a set of correlations to generate a start of data signal 424, an interpolator phase 426, and a gain scale 428. Start of data signal 424 may initiate processing of the data read from the data sector following the preamble. Interpolator phase 426 may be provided to a digital sample interpolator in the timing loop of the channel for synchronizing the phase of the read data bit samples at baud rate. Gain scale 428 may be provided to adjust a digital signal scaling function or provide a digital adjustment to an analog variable gain amplifier (VGA) function.

As shown in signals 440, various signals are responsive to the written pattern 442 for the data sector and, more specifically, padded cypher-lock field 444 preceding the sector data 446. Padded cypher-lock field 444 may be a unified data synchronization field including a circular cypher code that includes a repeated buffer portion and is thus longer than a single cycle of the circular sequence of the cypher code. When read gate 450 is triggered 452, cypher-lock detector 422 acquires on period of samples 462 in measurement window 460. For example, read gate 450 signals a start 464 of digital data samples received by cypher-lock detector 422 and the read data is received for a number of samples equaling one period (i.e., one complete set of bits corresponding to the cypher code length) to an end 466 of measurement window 460.

Responsive to receiving a set of digital samples to operate on, cypher-lock detector 422 may determine start of data (SOD) signal 470 and gain and phase signals 480. Once a valid set of correlations generate the corresponding signal values, a valid SOD signal 472 and gain and phase signals 480 may be forwarded to other components in the read channel to update timing and establish sector data processing from the first data bit in the sector.

FIG. 5A shows an example phase modulated cypher code 500 for use in a cypher-lock data synchronization field. In some configurations, cypher code 500 may be written to the storage medium in a unified synchronization field to be read back as a preamble to a corresponding data sector. The analog read signal read from the storage medium may be processed through a channel circuit, such as read/write channel 320 in control circuitry 300 in FIG. 3, to synchronize timing, gain, and start of data for the data sector. A single cypher-lock period 510 is shown, composed of a 15 pattern segment PRBS cypher code, using a (2⁴-1) length PRBS pattern. Each segment 512 may correspond to a bit value in the PRBS. For example, segments 512.1 and 512.2 may correspond to a 1, segment 512.3 may correspond to a 0, and so on along the sequence to segment 512.*n*, which also encodes a 1. While a 15 segment PRBS cypher code is shown, other numbers of segments (or code bits) in the cypher code may be selected. By correlating the read samples to an ideal PRBS, the start of data position may be determined.

Each segment may correspond to a phase modulated carrier value encoded in a series of magnetic domains and the field polarity transitions between them. In the example shown, each segment is 6 magnetic bits (6T) in length, representing a single carrier cycle with the rising edge modulated left or right to denote 1 or 0. Thus, the carrier segment length 514 is 6T with a center 516 corresponding to 3T on either side of center 516. Encoding the code bit using a phase modulated carrier may include shifting magnetic flux transition 518 to the left or write by 1T. For example, the left shift in segment 512.1 may represent a code bit of 1 and the right shift in segment 512.3 may represent a code bit of 0. The resulting carrier tone has a normalized frequency of 1/6T. Note that the carrier tone may be based on shorter or longer segments (e.g., 4T, 8T, etc.) and that other approaches to phase modulation may be used. For example, phase shift keying schemes may invert the carrier (shifted 180 degrees) to exhibit a suppressed carrier from which phase and gain may be determined. When using a modulated carrier based on bit shifting, the shift may be based on a larger shift, such as a 2T shift or larger within a larger segment size.

Multiplying the number of cypher code bit segments (e.g., 15 segments) times the number of bits in each segment (e.g., 6 magnetic bits) may determine cypher-lock period 510 and/or a corresponding cypher-lock pattern length (e.g., 90 magnetic bits). This pattern length may be a minimum written pattern length for conveying the start of data cypher code in the phase modulated carrier signal. As discussed elsewhere, the cypher-lock field may be written with cyclic redundancy by repeating at least a portion of the cypher-lock pattern to pad the cypher-lock field and limit the precision requirement of the read gate. For example, repeating 20-40 magnetic bits at either end of the circular code provides a wider margin for being able to read a complete cypher-lock cycle. Any number of repeated bits less than the pattern length may act as a buffer without risking a second occurrence of the code (and resulting shift of the start of data).

FIG. 5B shows the written pattern 520 to the storage medium and the resulting oversampled read signal 530 on readback from the storage medium. The graph for written pattern 520 includes a baud rate index 524 on the x axis and written pattern values 522 on the y axis, where the written pattern values are the 0 and 1 magnetic states and flux transitions cross the 0.5 line. The graph for oversampled read signal 530 aligns a baud rate index 534 on the x axis corresponding to baud rate index 524 and shows read signal samples 532 on the y axis based on the analog read signal read from written pattern 520 and oversampled by the ADC of the read channel. Based on phase modulated cypher code 500, written pattern 520 consists of 2-length (2T) and 4-length (4T) magnets and the oversampled signal samples (e.g., 4× oversampling) appear as a modulated carrier tone.

FIG. 6A shows three example correlator sequences 600 that may be used to extract information from the phase modulated cypher code. Correlator sequences 600 may process oversampled digital samples as input, but align them to the baud rate magnetic bits using a baud rate reference clock signal. Real carrier correlator 610 and imaginary carrier correlator 620 may include correlations to the phase modulated carrier signal and may be used to extract the gain and timing information from the read signal samples using conversion to magnitude and phase formats. For example, real carrier correlator 610 and imaginary carrier correlator 620 may be used together to determine both magnitude and phase of the carrier tone. These correlators may generate a single point discrete Fourier transform (DFT) at the carrier frequency using complex representation. The magnitude and phase of the carrier tone may be calculated as: magnitude=sqrt (real$^2$+imaginary$^2$); and phase=atan2 (imaginary, real). Real carrier correlator 610 may include amplitude values 612 on the y axis and a baud index 614 on the x axis for a real component correlation of the read signal samples to the target phase modulated signal for gain value determination. Imaginary carrier correlator 620 may include amplitude values 622 on the y axis and a baud index 624 on the x axis for an imaginary component correlation of the read signal samples to the target phase modulated signal for phase value determination.

Cypher correlator 630 may include correlations to the cypher code, such as the PRBS, for determining the position that correlates to the start of data. Cypher correlator 630 may include amplitude values 632 on the y axis and baud index 634 on the y axis for a correlation of the read signal samples to the target PRBS. In some configurations, correlator sequences 600 may also benefit from cypher wobble correction 640. Cypher wobble correction 640 may include an amplitude 642 on the y axis and a baud index 644 on the y axis for determining correction values to compensate for any wobble in the phase modulated carrier signal.

In some configurations, a series of cypher correlators that are circularly shifted versions of cypher correlator 630 may be used to locate the start of data while compensating for the possible variations of where the sampled pattern is starting (i.e., to address circular shifting through the repeated buffer portion). FIG. 6B shows an example cypher-lock correlator 650. Correlator 652 may correspond to the base cypher-lock pattern, similar to cypher correlator 630. Correlator matrix 654 may include additional correlators, each one bit shifted for correlator lags in direction 656. For example, each additional correlator corresponds to starting the cypher code from the next bit in the pattern. Line 658 may represent the correlator lags that are not in the measurement zone based on the amount of buffer overlap. A signal capture register 660 receives the set of samples from the oversampled digital read signal for the correlation. Signal capture register 660 may have a signal capture measurement length equal to the number of samples in one cycle or period of the cypher code, such as 90 bits in example cypher code 500. Processing the set of samples through correlator matrix 654 may generate correlations 662 indicating the position of the start of data.

FIG. 6C shows another example cypher-lock correlator 680 configured for greater hardware efficiency. Cypher-lock correlator 680 may include a correlator 682 and series of lag shifted correlators that form correlator matrix 684 in a similar lag direction 686 and with a portion out of the measurement zone as denoted by line 688. By using a signal capture register 690 that captures a series of input lags 692, the size of correlator matrix 684 may be reduced in terms of the total number of correlator lags in the matrix. For example, input lags 692 may correspond to three additional bit shifted sets of read samples collected from the read signal and used to calculate correlations 696 using a significantly smaller correlator matrix 684.

Figure 7:
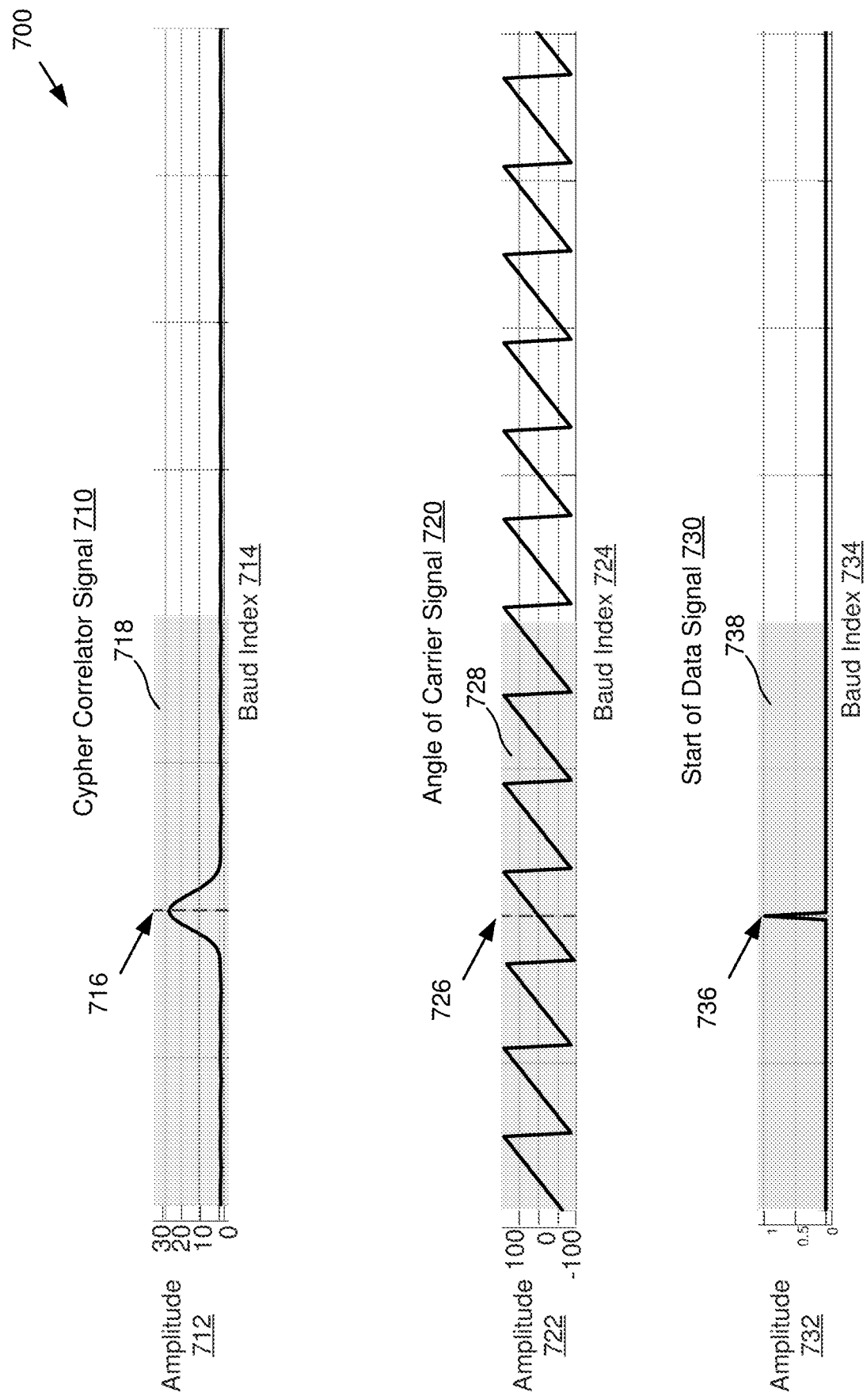
FIG. 7 is an example set of signal diagrams demonstrating correlation of the start of data signal.

FIG. 7 shows example signal processing for determining start of data signal 730 from cypher correlator signal 710 using the angle of carrier signal 720. Each of graphs 700 include a respective amplitude value 712, 722, 732 on their y axes and a common baud index 714, 724, 734 on their x axes. Each of graphs 700 also include a shaded constrained measurement region based on the buffer window (e.g., +/−20 bits). A maximum cypher correlation 716 along with a rising zero crossing 726 of the carrier phase locates a precise start of data position 736. Note that the exact zero crossing of the carrier phase may be an interpolated value between oversampled read signal samples. In some configurations, an offset from the start of data position 736 may correspond to the location of the first data bit in the data sector after the data synchronization preamble.

Figure 8:
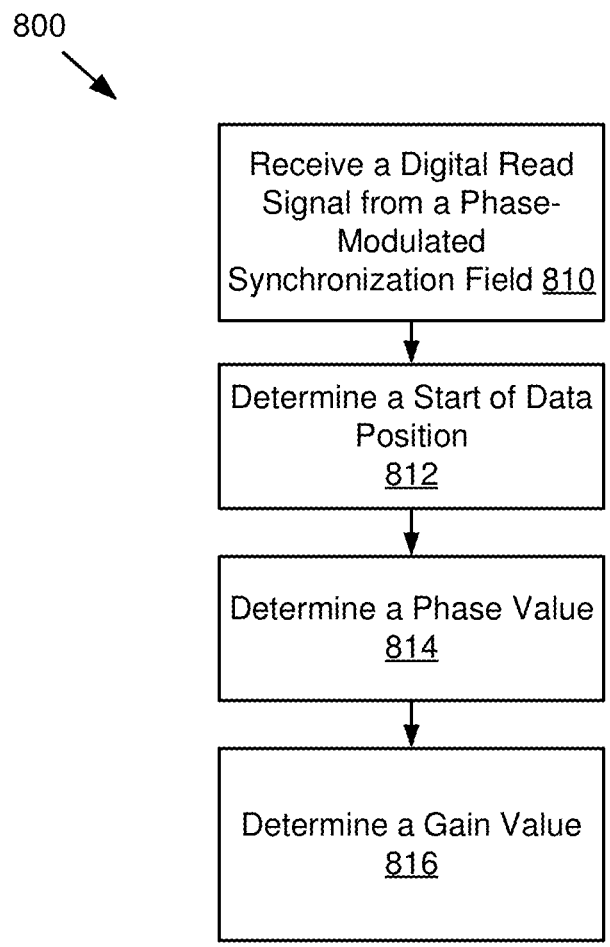
FIG. 8 is an example method of data synchronization based on a phase modulated synchronization field.

As shown in FIG. 8, control circuitry 300 may be operated according to an example method of data synchronization based on a phase modulated synchronization field, i.e., according to the method 800 illustrated by blocks 810-816.

At block 810, a digital read signal from a phase modulated synchronization field may be received. For example, a cypher-lock detector may receive a set of oversampled digital samples from the analog read signal corresponding to a cypher-lock field in the preamble of a data sector.

At block 812, a start of data position may be determined from the phase modulated synchronization field. For example, the phase modulated synchronization field may encode a cypher code pattern that indicates the start of position for the data sector following the preamble and the cypher-lock detectors may correlate the cypher-code pattern to a start of position value.

At block 814, a phase value may be determined from the phase modulated synchronization field. For example, the phase modulated synchronization field may encode the cypher code pattern in a phase modulated carrier signal and the cypher-lock detector may correlate the phase of the carrier signal to a phase value for adjusting the timing of the read channel for the subsequent data bits.

At block 816, a gain value may be determined from the phase modulated synchronization field. For example, the cypher-lock detector may correlate the gain of the carrier signal to a gain value for adjusting the gain filtering of the read channel for the subsequent data bits.

Figure 9:
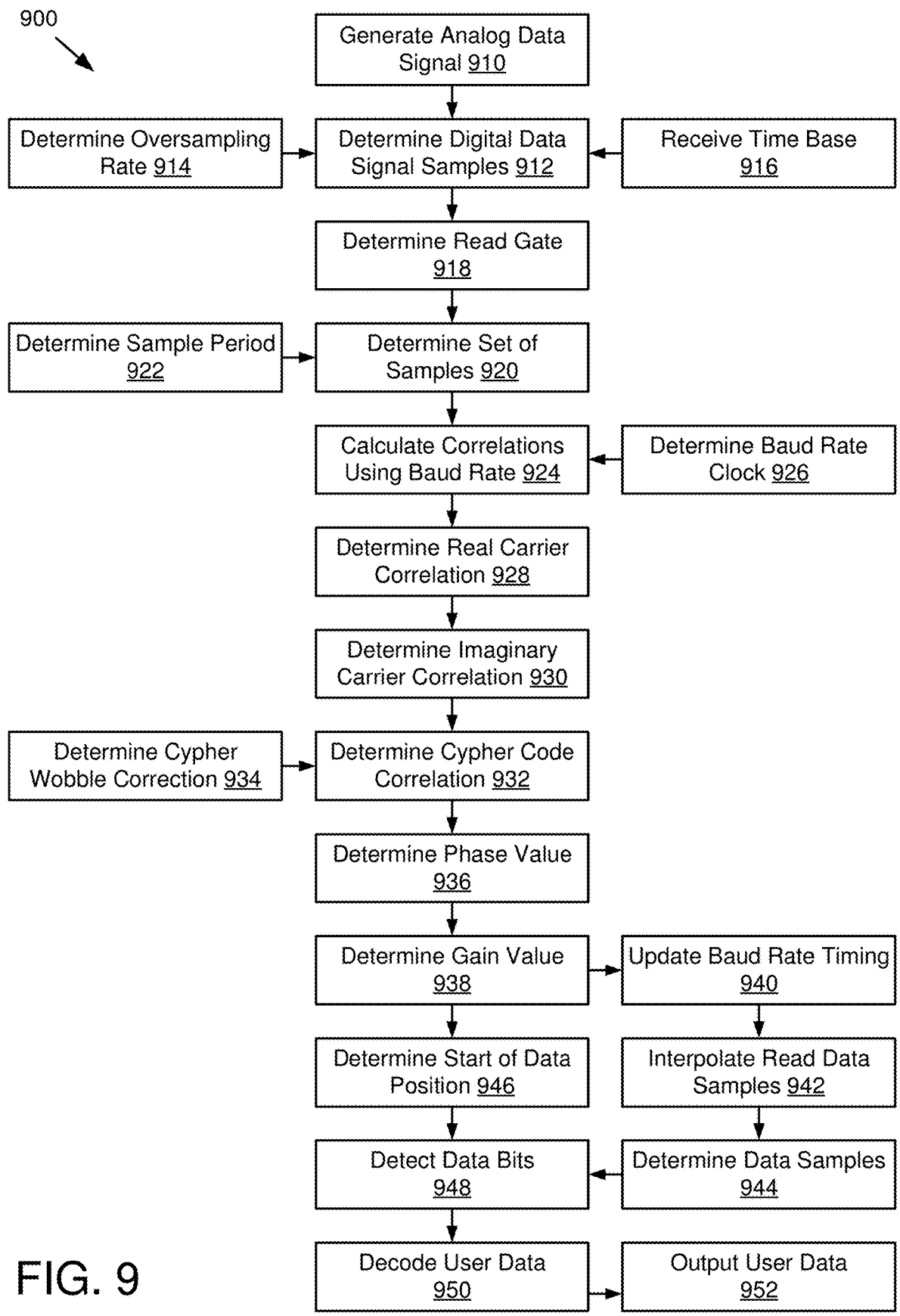
FIG. 9 is an example method of reading and decoding user data using a phase modulated synchronization field.

As shown in FIG. 9, control circuitry 300 may be operated according to an example method of reading and decoding user data using a phase modulated synchronization field, i.e., according to the method 900 illustrated by blocks 910-952.

At block 910, an analog data signal is generated. For example, a read head positioned over a data track on a storage medium may respond to the magnetic flux from the storage medium to generate an analog read signal and provide that analog read signal to a read channel.

At block 912, digital data signal samples may be determined. For example, an ADC in the read channel may receive the analog data signal and sample the analog data signal at an oversampling rate to generate digital samples at a multiple of the baud rate of the channel.

At block 914, the oversampling rate may be determined. For example, the ADC and an asynchronous timing circuit may be configured for an oversampling rate of 2, 4, or more times the baud rate of the channel and this same sampling rate may be used for data synchronization.

At block 916, a time base may be received. For example, the ADC may receive a clock signal for the drive circuitry that supports the oversampling rate.

At block 918, read gate may be determined. For example, the servo controller may determine servo gate for a target track and servo field identifier and the controller may determine one or more read gate conditions for generating a read gate signal to the cypher-lock detector.

At block 920, a set of samples may be determined. For example, the cypher-lock detector may initiate a sampling window from the read gate signal to collect a number of digital samples corresponding to a sample period for the cypher code pattern in the cypher-lock field.

At block 922, the sample period may be determined. For example, the cypher-lock detector may be configured with a sample period equal to one cycle of the cypher code pattern.

At block 924, correlations may be calculated using the baud rate of the channel. For example, the cypher-lock detector may calculate a plurality of correlations from the set of digital samples using a baud rate reference clock to align the correlations with the nominal bit timing of the magnetic bits on the storage medium.

At block 926, a baud rate clock may be determined. For example, the channel timing circuit may include a baud rate reference clock for the nominal bit timing and baud rate of the channel.

At block 928, a real carrier correlation may be determined. For example, the cypher-lock detector may calculate real carrier correlations from the phase modulated carrier signal.

At block 930, an imaginary carrier correlation may be determined. For example, the cypher-lock detector may calculate imaginary carrier correlations from the phase modulated carrier signal.

At block 932, a cypher code correlation may be determined. For example, the cypher-lock detector may determine a series of cypher code correlations to identify a best cypher code correlation for the set of digital samples.

At block 934, a cypher wobble correction may be determined. For example, the cypher-lock detector may include a wobble correction correlation to correct for wobble in the phase modulated carrier signal.

At block 936, a phase value may be determined. For example, the cypher-lock detector may determine a phase adjustment value from the correlations of blocks 928 and 930.

At block 938, a gain value may be determined. For example, the cypher-lock detector may determine a gain adjustment value from the correlations of block 928 and 930.

At block 940, baud rate timing of the read channel may be updated. For example, based on the phase value and gain value, data bit synchronization may be established and/or updated by the channel timing loop.

At block 942, read data samples may be interpolated. For example, the channel timing circuit may use the oversampled digital data samples to interpolate read data samples for maintaining and updating timing throughout a sector read operation.

At block 944, data samples may be determined. For example, the read channel may determine or select baud rate data samples for sector data processing based on the bit synchronization determined by the cypher-lock detector.

At block 946, a start of data position may be determined. For example, the cypher-lock detector may determine the start of data position from the cypher code correlation determined at block 932.

At block 948, data bits may be detected. For example, an iterative detector may detect data bits for the data sector starting based on the start of data position from block 946.

At block 950, user data may be decoded from the detected data bits. For example, the iterative detector may include an ECC decoder for deciding user data from an encoded series of data bits stored to the storage medium.

At block 952, user data may be output. For example, the channel circuit may output the decoded user data for further processing by the storage device and/or output to a host system.

Figure 10:
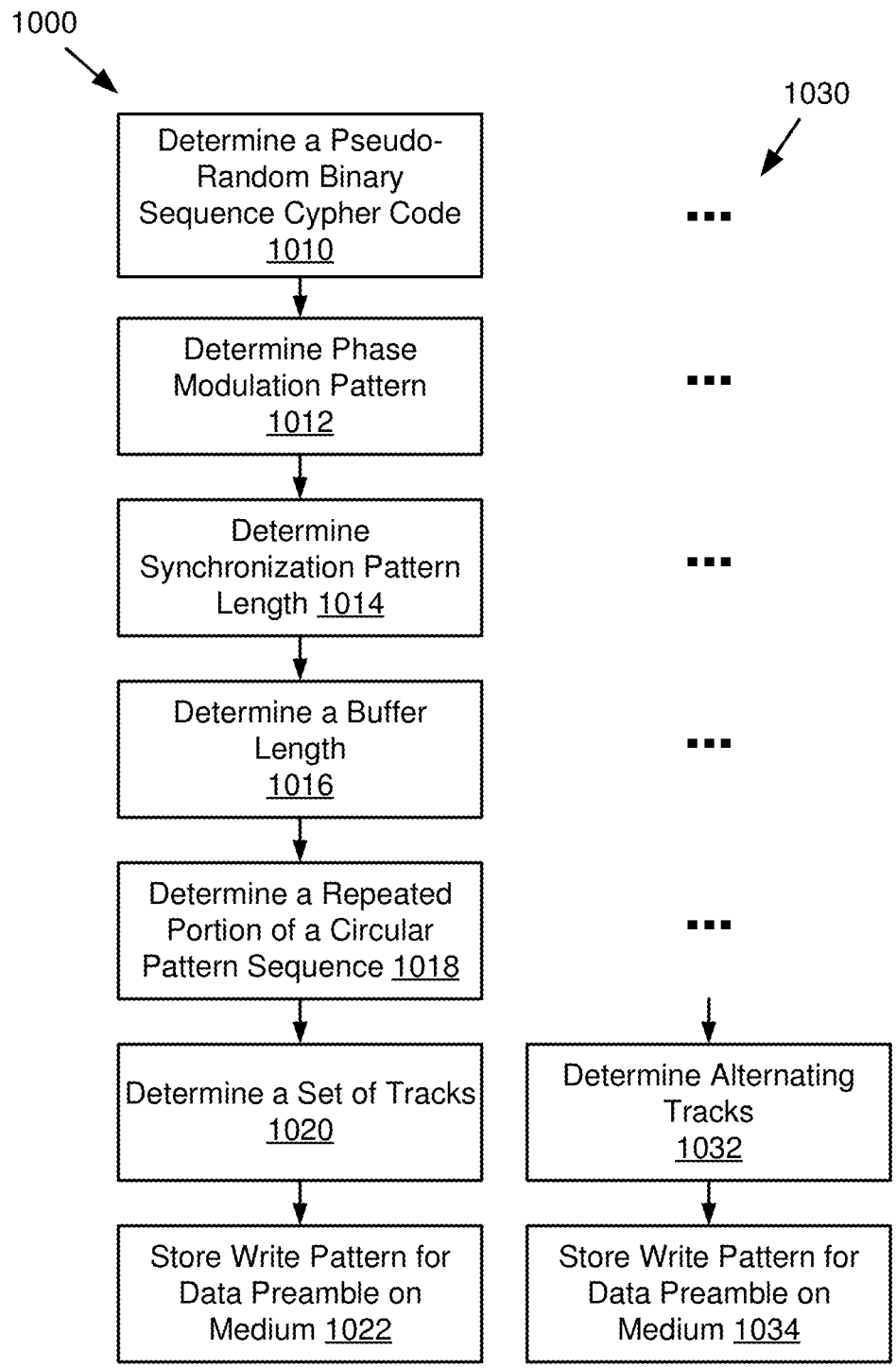
FIG. 10 is an example method of configuring media with a unified synchronization field for user data sectors.

As shown in FIG. 10, a data storage device may be configured according to an example method of configuring media with a unified synchronization field for user data sectors, i.e., according to the method 1000 illustrated by blocks 1010-1034.

At block 1010, a pseudo-random binary sequence cypher code may be determined. For example, the drive configuration may include selection of a PRBS cypher code to be used in the data synchronization field of at least some data sectors.

At block 1012, a phase modulation pattern may be determined. For example, the drive configuration may include selection of a phase modulation pattern that can be written to disk as a series of magnetic bits for encoding a phase modulated carrier signal.

At block 1014, a synchronization pattern length may be determined. For example, the number of bits in the PRBS cypher code multiplied by the number of magnetic bits for each segment of the phase modulation pattern may determine a cypher code length and minimum cypher-lock field length.

At block 1016, a buffer length may be determined. For example, the drive configuration may determine a number of additional bits for compensating for read gate timing in reading the cypher-lock field.

At block 1018, a repeated portion of a circular pattern sequence may be determined. For example, the PRBS cypher code may be a cyclic code and the buffer length determined at block 1016 may be filled with a repeated portion of the PRBS cypher code to determine the full cypher-lock field to be written to the storage medium.

At block 1020, a set of tracks may be determined. For example, the drive configuration may select the odd data tracks to receive the cypher-lock field from block 1018.

At block 1022, the write pattern for the data preamble may bs stored to the storage medium. For example, as odd data tracks are written, the cypher-lock field may be written to the storage medium as a data synchronization preamble for each data sector.

At 1030, a different cypher-lock field may be determined for another set of data tracks by following steps similar to those described for blocks 1010-1018 to provide distinct and/or orthogonal cypher-lock fields for adjacent tracks.

At block 1032, alternating tracks may be determined. For example, the drive configuration may select even data tracks to receive the different cypher-lock field from 1030.

At block 1034, the write pattern for the data preamble may be stored to the storage medium for the alternating tracks. For example, as even tracks are written, the different cypher-lock filed may be written to the storage medium as the data synchronization preamble for each data sector to ensure that adjacent tracks use distinct cypher-lock fields that reduce cross-track interference.

Technology for a unified data synchronization field based on encoding a phase modulated carrier signal with a cypher code as a preamble to each data sector is described above. In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some implementations above with reference to particular hardware.

Reference in the specification to "one embodiment" or "an embodiment" means that a particular feature, structure, or characteristic described in connection with the embodiment is included in at least one embodiment or implementation of the disclosed technologies. The appearances of the phrase "in one embodiment" in various places in the specification are not necessarily all referring to the same embodiment or implementation.

Some portions of the detailed descriptions above may be presented in terms of processes and symbolic representations of operations on data bits within a computer memory. A process can generally be considered a self-consistent sequence of operations leading to a result. The operations may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers, or the like.

These and similar terms can be associated with the appropriate physical quantities and can be considered labels applied to these quantities. Unless specifically stated otherwise as apparent from the prior discussion, it is appreciated that throughout the description, discussions utilizing terms for example "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, for example, but is not limited to, any type of disk including floppy disks, optical disks, CD-ROMs, and magnetic disks, read-only memories (ROMs), random access memories (RAMs), erasable programmable read-only memories (EPROMs), electrically erasable programmable read-only memories (EEPROMs), magnetic or optical cards, flash memories including universal serial bus (USB) keys with non-volatile memory or any type of media suitable for storing electronic instructions, each coupled to a computer system bus.

The disclosed technologies can take the form of an entire hardware implementation, an entire software implementation or an implementation containing both hardware and software elements. In some implementations, the technology is implemented in software, which includes but is not limited to firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The terms storage media, storage device, and data blocks are used interchangeably throughout the present disclosure to refer to the physical media upon which the data is stored.

Finally, the processes and displays presented herein may not be inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description above. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A channel circuit, comprising:
   a data synchronization detector circuit comprising at least one correlator circuit and configured to:
      receive a digital read signal comprising a plurality of samples from a synchronization field, wherein the synchronization field comprises a written pattern for a phase modulated carrier signal;
      determine, using the at least one correlator circuit, a start of data position from the plurality of samples;
      determine, using the at least one correlator circuit, a phase value from the plurality of samples; and
      determine, using the at least one correlator circuit, a gain value from the plurality of samples.

2. The channel circuit of claim 1, further comprising:
   a data detector circuit configured to, responsive to the start of data signal, detect data encoded in data samples in the digital read signal following the plurality of samples from the synchronization field, wherein the data samples are based on the phase value and the gain value.

3. The channel circuit of claim 1, further comprising:
   an analog-to-digital converter configured to determine the digital read signal from an analog read signal by oversampling the analog read signal at a multiple of a baud rate of the channel circuit, wherein an oversample rate of the analog-to-digital converter is at least two times the baud rate.

4. The channel circuit of claim 3, further comprising:
   a reference clock configured to determine a baud rate clock signal, wherein the data synchronization detector circuit uses the baud rate clock signal to determine the start of data position from the plurality of samples at the oversampled rate.

5. The channel circuit of claim 1, further comprising:
   a read gate detector configured to determine a read gate signal from the digital read signal, wherein:
      the written pattern for the synchronization field is a circular sequence having:
         a cypher code length; and
         a buffer length corresponding to a repeated portion of the circular sequence; and
      the data synchronization detector circuit is further configured to determine the plurality of samples for at least the cypher code length responsive to the read gate signal.

6. The channel circuit of claim 1, wherein the written pattern for the synchronization field is a circular sequence comprising:
   a cypher code having a cypher code length; and
   a buffer length corresponding to a repeated portion of the circular sequence.

7. The channel circuit of claim 1, wherein:
   the at least one correlator circuit comprises a correlator matrix including a number of correlator lags greater than a sample period of the plurality of samples; and
   a signal capture register with a length of the sample period and a plurality of lags configured to reduce a size of the correlator matrix.

8. A data storage device comprising the channel circuit of claim 1 and further comprising:
   a non-volatile storage medium configured to store:
      user data stored in a plurality of data sectors; and synchronization fields preceding each data sector of the plurality of data sectors; and
a read element configured to generate an analog data signal from the non-volatile storage medium.

9. A channel circuit, comprising:
a data synchronization detector circuit configured to:
receive a digital read signal comprising a plurality of samples from a synchronization field, wherein:
the synchronization field comprises a written pattern for a phase modulated carrier signal; and
the written pattern comprises a pseudo random binary sequence;
determine a start of data position from the pseudo random binary sequence;
determine a phase value from the plurality of samples; and
determine a gain value from the plurality of samples.

10. A channel circuit, comprising:
a data synchronization detector circuit configured to:
receive a digital read signal comprising a plurality of samples from a synchronization field, wherein:
the synchronization field comprises a written pattern for a phase modulated carrier signal;
the phase modulated carrier signal is based on a series of sets of magnetic domains having a segment length;
the sets of magnetic domains comprise a field polarity transition; and
a direction of offset of the field polarity transition from a center of the segment length determines a bit value in the write pattern;
determine a start of data position from the plurality of samples;
determine a phase value from the plurality of samples; and
determine a gain value from the plurality of samples.

11. A method comprising:
generating, from a non-volatile storage medium, an analog read signal; and
determining, by an analog-to-digital converter, a digital read signal from the analog read signal by oversampling the analog read signal at a multiple of a baud rate of a channel circuit, wherein:
an oversample rate of the analog-to-digital converter is at least two times the baud rate;
the digital read signal comprises a plurality of samples from a synchronization field; and
the synchronization field comprises a written pattern for a phase modulated carrier signal;
determining a start of data position from the plurality of samples;
determining a phase value from the plurality of samples; and
determining a gain value from the plurality of samples.

12. The method of claim 11, further comprising, responsive to the start of data signal:
determining, based on the phase value and the gain value, data samples in the digital read signal following the plurality of samples from the synchronization field;
detecting data encoded in the data samples; and
outputting the data from the data samples.

13. The method of claim 11, wherein the written pattern for the synchronization field is a circular sequence comprising:
a cypher code having a cypher code length; and
a buffer length corresponding to a repeated portion of the circular sequence.

14. The method of claim 11, further comprising:
determining a baud rate clock signal; and
using the baud rate clock signal to determine the start of data position from the plurality of samples at the oversampled rate.

15. The method of claim 11, further comprising:
determining a read gate signal from the digital read signal, wherein:
the written pattern for the synchronization field is a circular sequence having:
a cypher code length; and
a buffer length corresponding to a repeated portion of the circular sequence; and
determining, responsive to the read gate signal, the plurality of samples for at least the cypher code length.

16. The method of claim 11, wherein:
the written pattern comprises a pseudo random binary sequence; and
determining the start of data position is based on the pseudo random binary sequence.

17. The method of claim 11, wherein:
the phase modulated carrier signal is based on a series of sets of magnetic domains having a segment length;
the sets of magnetic domains comprise a field polarity transition; and
a direction of offset of the field polarity transition from a center of the segment length determines a bit value in the write pattern.

18. The method of claim 11, further comprising:
determining a first correlation from the plurality of samples indicating the start of data position;
determining a second correlation from the plurality of samples indicating the phase value; and
determining a third correlation from the plurality of samples indicating the gain value.

19. The method of claim 11, further comprising:
determining a pseudo random binary sequence cypher code for the write pattern for indicating the start of data position;
determining a phase modulation pattern for the write pattern for encoding the phase modulated carrier signal;
determining a first written pattern for the synchronization field of a first set of data tracks; and
determining a second written pattern for the synchronization field of a second set of data tracks alternating with the first set of tracks, wherein the first written pattern is orthogonal to the second written pattern.

20. A data storage device comprising:
a non-volatile storage medium;
a channel circuit;
means for receiving a digital read signal comprising a plurality of samples from a synchronization field, wherein the synchronization field comprises a written pattern for a phase modulated carrier signal;
means for determining a start of data position from the plurality of samples;
means for determining a phase value from the plurality of samples;
means for determining a gain value from the plurality of samples; and
means for detecting, responsive to the start of data signal, data encoded in data samples in the digital read signal following the plurality of samples from the synchronization field, wherein the data samples are based on the phase value and the gain value.

* * * * *